United States Patent [19]

Shaw et al.

[11] Patent Number: 5,563,482
[45] Date of Patent: Oct. 8, 1996

[54] POWER TOOLS

[75] Inventors: David M. Shaw, Barnard Castle, United Kingdom; Rosario Ferragina, Lipomo, Italy

[73] Assignee: Black & Decker Inc., Newark, Del.

[21] Appl. No.: 316,182

[22] Filed: Sep. 30, 1994

[30] Foreign Application Priority Data

Sep. 30, 1993 [GB] United Kingdom .................. 9320181

[51] Int. Cl.⁶ ..................................................... H02P 3/00
[52] U.S. Cl. ...................... 318/272; 318/476; 73/862.23; 173/176
[58] Field of Search .................................... 318/272, 434, 318/474, 476; 73/862.23; 173/6, 7, 176, 180–183

[56] References Cited

U.S. PATENT DOCUMENTS

| | | |
|---|---|---|
| 3,845,373 | 10/1974 | Totsu et al. . |
| 4,013,895 | 3/1977 | Aklyoshi et al. . |
| 4,249,117 | 2/1981 | Leukhardt et al. ...................... 318/275 |
| 4,273,198 | 6/1981 | Doniwa . |
| 4,780,654 | 10/1988 | Shoji et al. .............................. 318/434 |
| 4,823,057 | 4/1989 | Eley ...................................... 318/434 X |
| 5,017,846 | 5/1991 | Young et al. ............................. 318/244 |
| 5,038,084 | 8/1991 | Wing ....................................... 318/268 |
| 5,170,106 | 12/1992 | Ogasawara ............................... 318/434 |
| 5,245,747 | 9/1993 | Hansson .................................. 318/434 |
| 5,410,229 | 4/1995 | Sebastian et al. ....................... 318/434 |

FOREIGN PATENT DOCUMENTS

| | | |
|---|---|---|
| 0087373 | 8/1983 | European Pat. Off. . |
| 187353 | 7/1986 | European Pat. Off. . |
| 0187353 | 7/1986 | European Pat. Off. . |
| 2087583 | 12/1971 | France . |
| 2505393 | 8/1976 | Germany . |
| 2170329 | 7/1986 | United Kingdom . |

Primary Examiner—Brian Sircus
Attorney, Agent, or Firm—Dennis A. Dearing; John D. Del Ponti; Charles E. Yocum

[57] ABSTRACT

A drill/driver (eg. an electric drill) with a screwdriver attachment, and a method of controlling the drill/driver, are described. A control circuit (30) controls the speed of rotation of the motor (38, 39) through a time delay circuit (42) and a triac (41). The control circuit (30) uses the time delay information and information inputted from a rotational speed sensor (43) to monitor the current in the motor or a parameter related at least in part to current in the motor. When a change corresponding to an increase in the rate of change of current in the motor is detected, the control circuit (30) stops the motor to provide an automatic torque control feature for a screwdriving operation.

14 Claims, 12 Drawing Sheets

| TIME POSITION | HEXADECIMAL | DECIMAL | |
|---|---|---|---|
| -150ms | 176 | 374 | 8 OLD |
| -140ms | 174 | 372 | |
| -130ms | 176 | 374 | |
| -120ms | 173 | 371 | |
| -110ms | 172 | 370 | |
| -100ms | 173 | 371 | |
| - 90ms | 176 | 374 | |
| - 80ms | 172 | 370 | |
| - 70ms | 173 | 373 | 8 NEW |
| - 60ms | 172 | 370 | |
| - 50ms | 174 | 372 | |
| - 40ms | 172 | 370 | |
| - 30ms | 174 | 372 | |
| - 20ms | 176 | 374 | |
| - 10ms | 175 | 373 | |
| ACTUAL (∅) | 172 | 370 | |

FIG.10

| TIME POSITION | HEXADECIMAL | DECIMAL | |
|---|---|---|---|
| -150ms | 176 | 374 | ⎫ |
| -140ms | 174 | 372 | |
| -130ms | 176 | 374 | |
| -120ms | 173 | 371 | 8 OLD |
| -110ms | 172 | 370 | |
| -100ms | 173 | 371 | |
| - 90ms | 176 | 374 | |
| - 80ms | 172 | 370 | ⎭ |
| - 70ms | 173 | 373 | ⎫ |
| - 60ms | 172 | 370 | |
| - 50ms | 174 | 372 | |
| - 40ms | 172 | 370 | 8 NEW |
| - 30ms | 174 | 372 | |
| - 20ms | 176 | 374 | |
| - 10ms | 175 | 373 | |
| ACTUAL (∅) | 172 | 370 | ⎭ |

FIG.11

| TIME POSITION | HEXADECIMAL | DECIMAL | |
|---|---|---|---|
| -150ms | 162 | 354 | 8 OLD |
| -140ms | 160 | 352 | |
| -130ms | 17F | 351 | |
| -120ms | 15D | 349 | |
| -110ms | 15B | 347 | |
| -100ms | 15A | 346 | |
| - 90ms | 159 | 345 | |
| - 80ms | 158 | 344 | |
| - 70ms | 157 | 343 | 8 NEW |
| - 60ms | 156 | 342 | |
| - 50ms | 154 | 340 | |
| - 40ms | 153 | 339 | |
| - 30ms | 151 | 337 | |
| - 20ms | 150 | 336 | |
| - 10ms | 14E | 334 | |
| ACTUAL (φ) | 14D | 333 | |

POWER TOOLS

This invention relates to power tools, for example hand-held power tools and bench-mounted power tools. The invention has particular reference to hand-held and bench-mounted power screwdrivers and power drills with a screw-driving facility, and which are referred to as "drill/drivers" herein.

The efficient and economic use of power tools depends upon the correct selection of the conditions under which the tools is to be operated. For example, in a power drill, the speed of rotation of the drill bit depends upon the drill size and the material of the workpiece upon which the drill is to be used. In the case of screwdriving, the rotational speed of the screwdriver is determined in accordance with the screw size. It is also important to be able to stop the tool when the screw has been screwed home fully to avoid overloading the tool driving motor or damage the workpiece.

It has been proposed to employ electronic means to determine, in accordance with information fed to the means by a user, the rotational speed of the motor driving the tool holder of the power tool, such means also maintaining the set speed at a constant value and monitoring the conditions under which the power tool is operating. In particular, the means may monitor the torque exerted by the tool and operate to de-energise the power tool motor in the event that the torque exceeds a safe value, but the prior proposals have not been totally effective.

Accordingly, it is an object of the present invention to provide a power tool with a more effective torque sensing and control arrangement.

One aspect of the present invention is based upon the results of observations of the current which passes through the motor of the power tool during operation, and specifically of the current passing through the motor of a drill/driver as herein defined as it operates to screw a screw into a workpiece. In this respect reference is made to FIG. 4 of the accompanying drawings, which is a graph showing changes in motor current (vertical axis) against time (longitudinal axis) that take place during a screw driving operation. The contour of the graph is substantially the same for all permitted screw sizes but the actual current values will depend on the screw size. During period T1, there is a gradual increase in motor current as the screw penetrates the surface of and starts to enter a workpiece, there being a gradual increase in the resistance to rotation offered to the screw. There then follows a time period T2 during which the current flow is substantially constant as the screw thread enters and is driven further into the workpiece. At the end of time period T2, the screw is almost fully home and the screw head engages the surface of the workpiece. As the pressure between the screw head and the surface increases, there is a rapid increase in motor current over the time period T3 at the end of which the screw is fully home and it is then essential to de-energise the tool motor.

One aspect of the present invention monitors the current in the motor of the tool, and takes advantage of the rapid increase in current when the head of the screw comes into contact with the workpiece.

According to this aspect of the present invention, therefore, a drill/driver as herein defined comprises a rotatable shaft adapted to mount a screwdriver bit, a motor for rotatably driving the shaft, means for monitoring the current in the motor or for monitoring a parameter related at least in part to current in the motor, and means responsive to a detected change corresponding to an increase in the rate of change of current in the motor, and operative to stop the motor.

For example, the drill/driver may comprise a speed controller for controlling the speed of rotation of the motor. The means for monitoring the current or other parameter may then monitor the power consumption of the motor.

In one embodiment, the motor may be an A.C. motor; the speed controller may include voltage controlled rectifier means (also known as gated rectifier means), such as a triac bidirectional rectifier, for controlling the "power-on" portion or portions of each A.C. cycle in order to achieve a desired speed. The means for monitoring the current or other parameter may then comprise means for monitoring the duration of each "power-on" portion. This can be done by monitoring the conduction time of the voltage controlled rectifier means, or by monitoring the relative phase (time delay) at which the voltage controlled rectifier means is triggered. The duration of the "power-on" portion will be related to the load under which the motor is operating, and hence to the current consumption of the motor.

In some circumstances it may be desirable to continue the screwing operation after the rate of current change has increased, and in one embodiment therefore a time delay is built into the control mechanism to delay, e.g. for a second or so, the motor cut-off. In another embodiment a manual override may be provided, so that the user may select either automatic cut-off control or manual control.

The means for monitoring the current or other parameter, and the means for stopping the motor may be implemented in dedicated hardware circuits, and/or by processor means (e.g. a microprocessor or a microcontroller) programmed and configured by software.

In a closely related manner, this aspect of the invention also provides a method of controlling a drill/driver as defined herein, the drill/driver including a rotatable shaft adapted to mount a screwdriving bit and a motor for rotatably driving the shaft, the method comprising a first step of monitoring the current in the motor or monitoring a parameter related at least in part to the current in the motor, and a second step of stopping the motor in response to detection of a change corresponding to an increase in the rate of change of current in the motor.

According to a further aspect of the present invention there is provided a method of controlling a drill/driver, the drill/driver including a rotatable shaft arranged to mount a screwdriver bit and a motor for rotatably driving the shaft, the motor being driven only during predetermined conduction periods, the method arranged to provide, within a given time period, a value which is a function of the conduction period necessary to maintain a given motor speed, and wherein the motor is stopped if this value has exceeded a predetermined amount before the end of the given time period.

By way of example only, two emobidments of hand-held power drill/driver according to the present invention will now be described in greater detail with reference to the accompanying drawings of which:

FIGS. 4 and 5a/b are explanatory diagrams,

Figure 1:
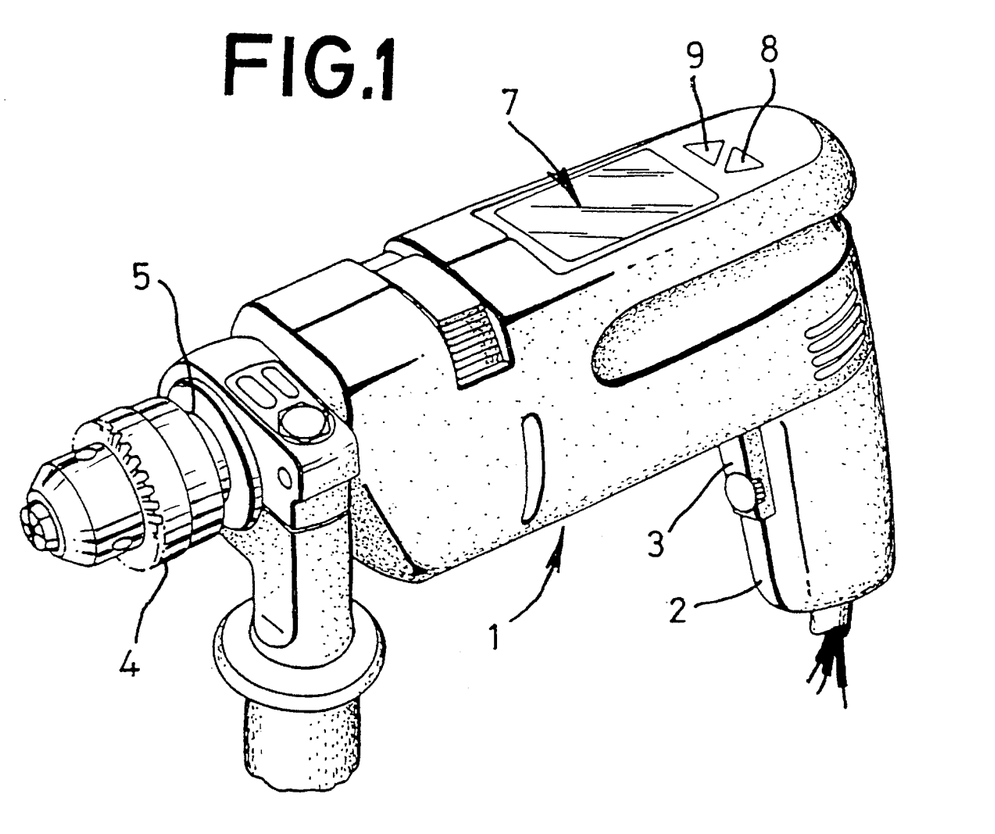
FIG. 1 is a perspective view of part of the drill/driver.

The drill/driver shown in FIG. 1 is of generally conventional outward appearance having a body 1 and a handle 2 with a trigger 3 that controls an ON/OFF switch housed in the handle 2. The trigger 3 also incorporates a reversing switch (not shown), although if desired the selection of reverse may be prevented other than during a screwdriving operation. A chuck 4 is detachably mounted on the end of a drive shaft 5 that extends from the body 1 as shown.

Located on the upper surface of the body 1 in a position easily accessible to, and easily visible to, a user is a keyboard 6 and a display, for example a liquid crystal display (LCD) screen which, together, make up a display panel 7. The display panel 7 is part of a unit that is accommodated within the body 1 and that is held between the clam shell halves that make up the body 1 and handle 2.

Figure 2:
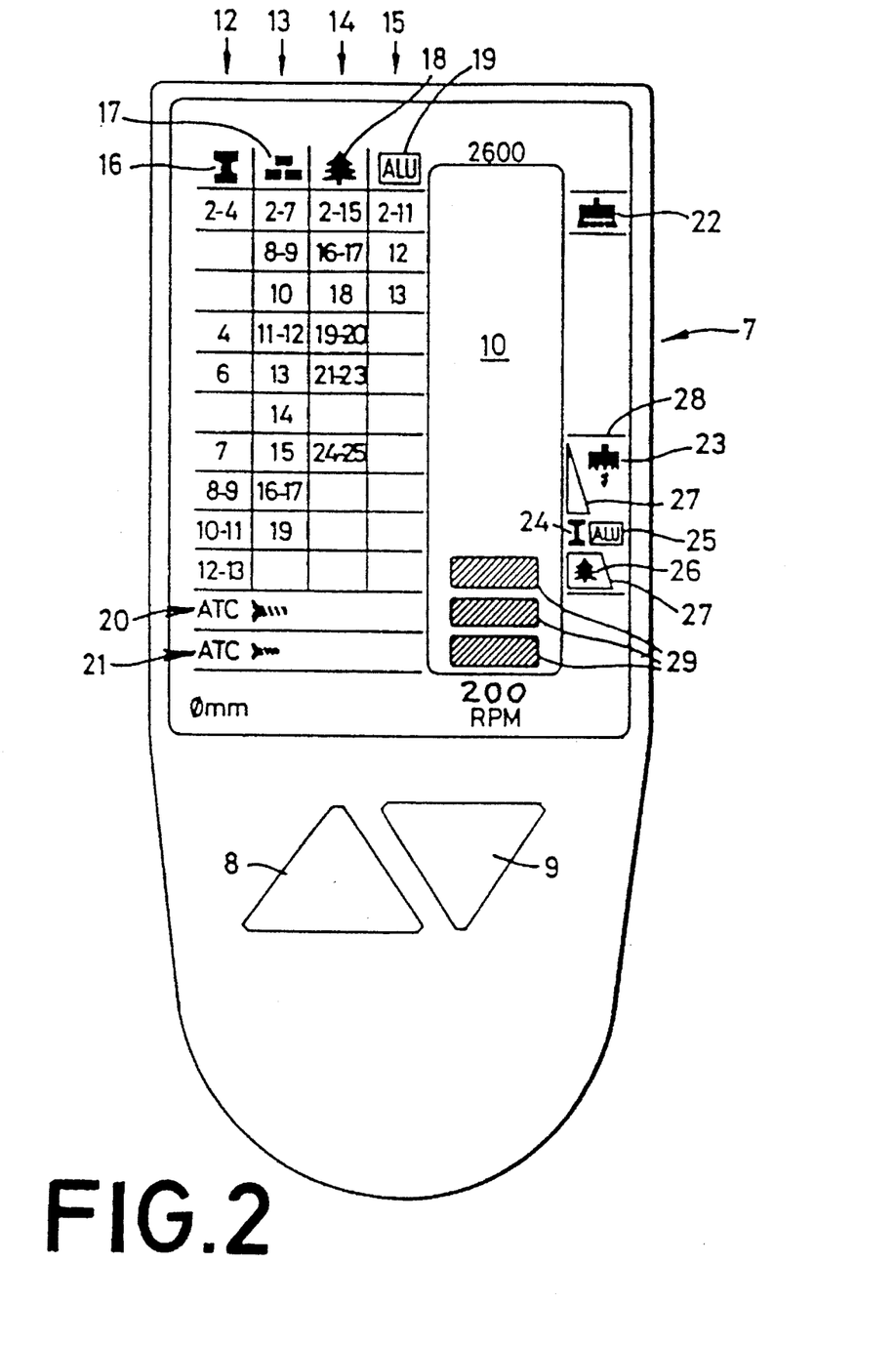
FIG. 2 is a plan view of a display panel and keyboard of the drill/driver.

The keyboard 6 has two keys covered by a membrane that covers the actual keys and has upstanding portions 8, 9 in the form of arrow heads that identify the individual keys. To enable a user readily to identify which key to use, the arrow heads 8, 9 point upwardly and downwardly respectively and bear the legends "+" and "−". Beneath the upstanding portions are located the movable elements of the key switches. Such elements may comprise blocks of conductive rubber that are attached to or integral with the membrane and which cooperate with fixed contacts on a surface below the membrane to form the key switches. Downward pressure on an upstanding portion of the membrane brings the block of conductive rubber into electrical contact with the respective fixed contact or conductor pattern on the printed circuit board. As soon as the pressure is removed, the block moves away from the fixed contact.

The LCD 10 forms part of the display panel 7 which has, adjacent the display 10, columns 12, 13, 14, 15 each with a series of numbers that are drill sizes expressed in millimetres. The numbers are arranged in horizontal rows as shown. At the head of each column are symbols 16, 17, 18, 19 that indicate, respectively, metal workpieces, brick workpieces, wooden workpieces and aluminium workpieces. Below the columns are two horizontal sections 20 and 21 that contain symbolic representations of screws of different sizes and the letters "ATC" (Automatic Torque Control). At the upper right hand edge of the display 10 is symbol 22 representing a polishing or wirebrushing brush. On the right hand side of the display 10 towards the lower end thereof is a set of symbols 23, 24, 25, 26 that represent respectively a hole cutter, metal workpieces, aluminium workpieces, and wooden workpieces. Engraved on the surface of the display panel in the vicinity of the symbols 23...26 is a two-part arrow head 27 whose point terminates just below a horizontal line 28.

At the lower end of the display panel, as viewed in FIG. 2, is the marking Ømm. (diameter).

The LCD 10 consists of a series of twelve bar segments arranged one above the other. The segments become visible when the switches are operated by a user, depression of the "+" switch causing the number of visible segments to increase from the bottom of the display, whilst depression of the "−" switch has the reverse effect. Depressing both switches together causes the motor to run at maximum speed. By way of example, three visible segments are shown in FIG. 2 at 29. As can be seen from FIG. 2 the segments are so positioned in the display that, when visible, they are aligned with the different horizontal rows of numbers of the columns 12 ... 15. The display panel 7 enables a user to select the optimum speed (with automatic torque control for screwdriving) for small or large screws (as denoted by the sections 20, 21) or for drilling in metal, brick, wood or aluminium (as denoted by legends 12, 13, 14, 15), or for polishing/wirebrushing (as denoted by legend 22), or hole cutting (as denoted by legend 23 in association with the range legends 24–28).

Beneath the lower end as viewed in FIG. 2, of the LCD display is the marking 200 RPM (the minimum motor speed) on the same horizontal row as the marking Ømm. Above the upper end of the display is the marking 2600 RPM (the maximum motor speed).

Figure 3:
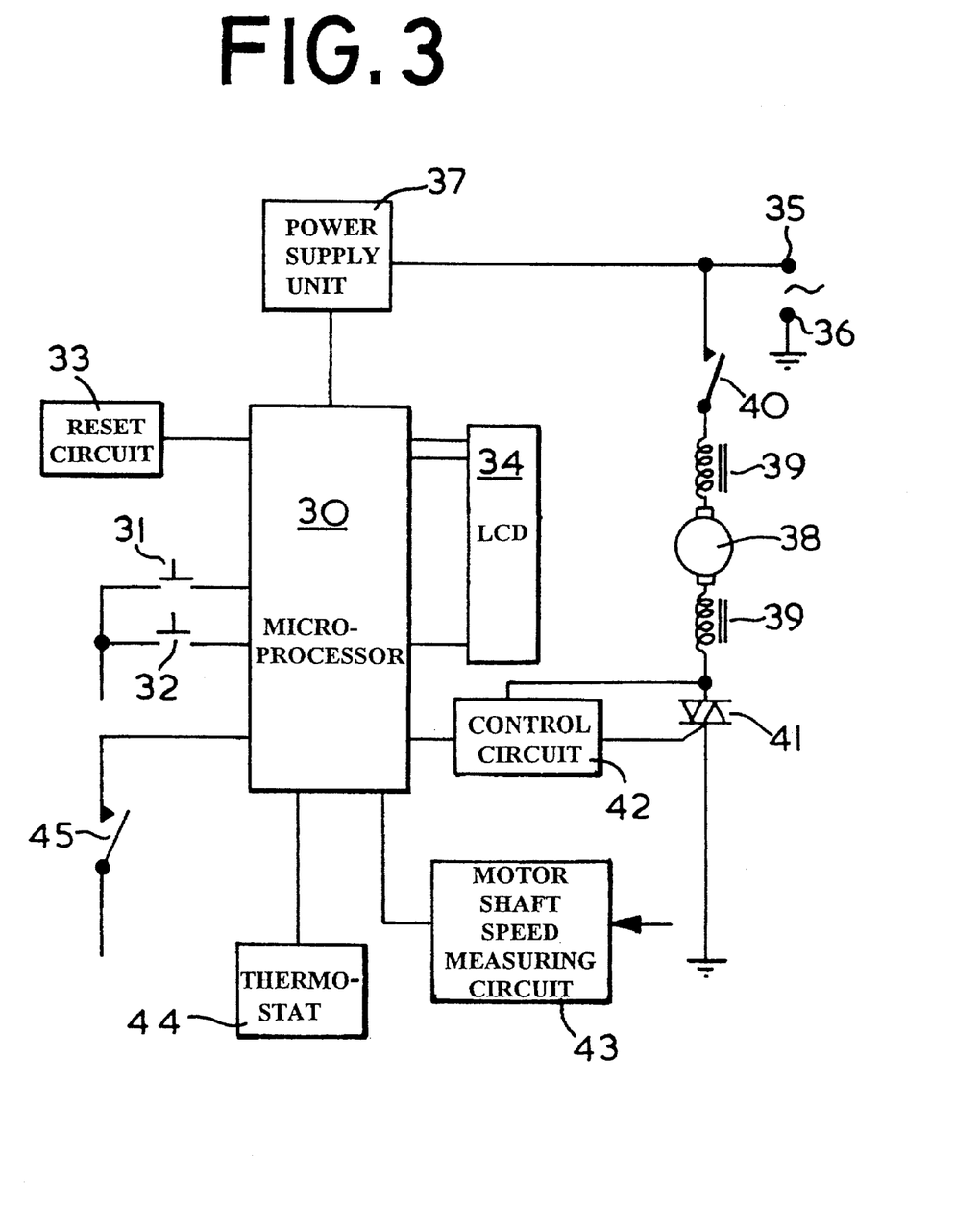
FIG. 3 is a block schematic of the control means of the drill/driver.

FIG. 3 is a block schematic diagram of the tool motor control circuit and comprises a microprocessor 30, for example type 50927 made by the Mitsubishi Company of Japan. The keys of the keyboard beneath the arrow heads 8, 9 shown in FIG. 2 are indicated at 31 and 32 respectively and they input directly to microprocessor 30. Block 33 represents a reset circuit whose function is described below. Block 34 is the LCD 10 whose segments are energised directly from microprocessor 30 as shown. The control circuit is energised from a mains supply at terminals 35, 36 via a power supply unit shown as block 37 and which drops the mains voltage to levels required by the control circuit and at the same time provides the conventional voltage stabilisation. Connected across the terminals 35, 36 is the tool driving motor armature 38 and its series connected field windings 39. The trigger-operated motor control switch is shown at 40. The supply of power to the motor is regulated by a triac 41 that is series connected with the motor and whose firing angle is controlled by the microprocessor 30 via a control circuit shown in FIG. 3 as block 42. In this exemplary embodiment, the control circuit 42 comprises a programmable timer which is supplied with a 4-bit time delay input from the micro-processor 30. The time delay corresponds to the phase angle delay at which the triac 41 is to be triggered into conduction. Regulation of the rotational speed of the motor is effected by the microprocessor in conjunction with a motor shaft speed measuring circuit represented by block 43. Circuit 43 receives an input from a speed sensing device (not shown) associated with the motor shaft and which may be an optical sensor comprising a slotted disc mounted on the shaft and a light source arranged to direct light through the slotted disc onto a light responsive device. Alternatively, the sensor may be a form of magnetic sensor, for example a Hall effect type sensor, or a coil.

The control circuit also provides soft start on all operations, anti-kick back protection in all modes, rotation in the reverse direction being permitted only in the screwdriving mode and following operation of the anti-kick back protection.

Also included in the control circuit is thermal protection of the motor by means of a thermistor or thermostat shown as block 44 that provides a signal indicating motor temperature.

When the drill/driver is operating in the drilling mode, the control circuit permits the user to select the optimum speed for the drill size and work piece material and maintains that speed despite permitted variations in the load on the motor.

When the drill/driver is operating in the screwdriving mode, the control circuit allows selection of small or large screws and automatic torque control.

In the hole cutting mode, optimum speed selection and control thereof is provided.

In both polishing and wirebrushing modes the control circuit maintains the motor speed at a constant value despite permitted variations in the load on the motor.

Reference 45 represents information contacts on the reversing switch.

As has been explained above, when a screw driving operation is being carried out, it is important to be able to stop the tool motor when the screw has been driven fully home. The drill/driver incorporates torque control to achieve that facility.

Figure 5:
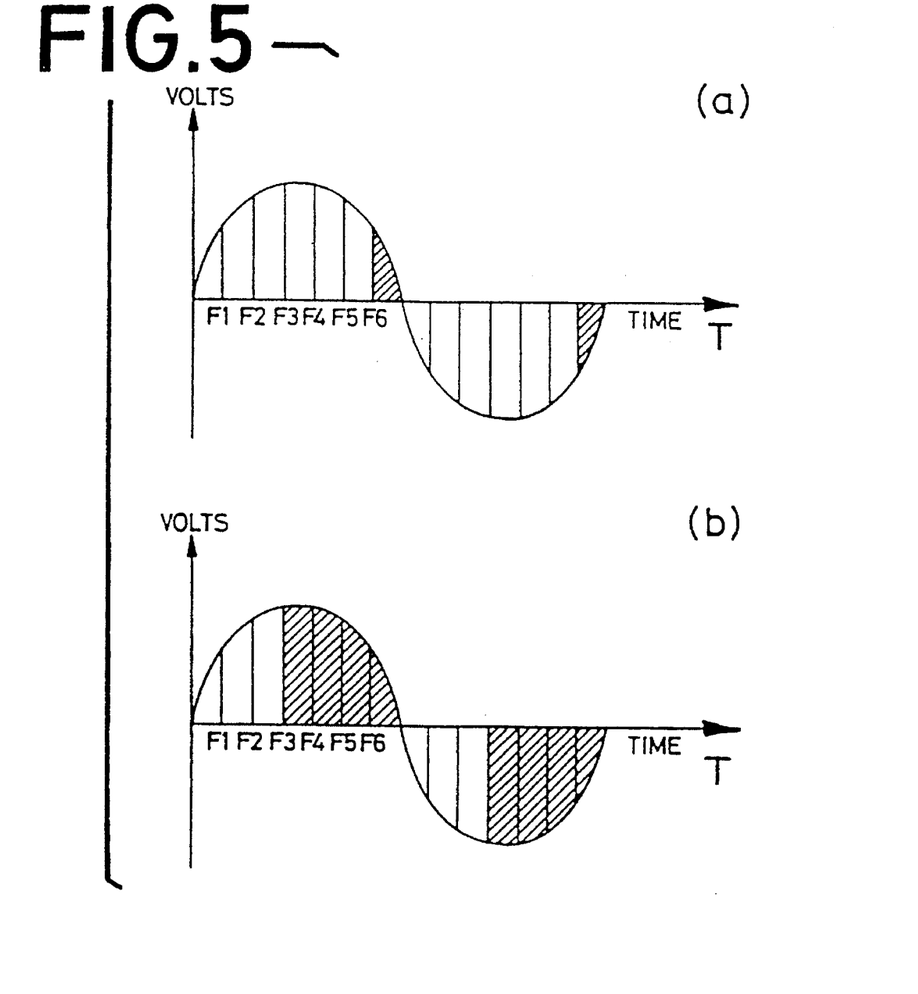

FIGS. 5(a) and 5(b) are waveforms showing the triac conduction patterns when (a) the driver is driving the shank of the screw into the workpiece and (b) the head of the screw comes into contact with the workpiece. In these waveforms, the lines F1 . . . F6 represent a set of firing angles, the firing angles being a measure of the time the triac is on (i.e. the triac conduction time) in order to mm the chuck of the driver at a certain predetermined speed, e.g. 200 r.p.m. As load is applied to the chuck the conduction time is increased, in order to maintain the required speed. Thus, while the shank is being driven into the workpiece, FIG. 5(a), the conduction time (or firing angle) represented by the hatched portion is small. When the screw head reaches the workpiece, however, a substantial increase in conduction time would be required to maintain the speed, as shown by the hatched portion in FIG. 5(b). The microprocessor 30 is programmed to recognise the sudden change from the FIG. 5(a) situation to that of FIG. 5(b) and stop the motor when this occurs.

Thus, as mentioned, the lines F1 . . . . F6 on FIGS. 5(a) and (b) represent a set of firing angles of the triac, and by monitoring the rate of increase in the firing angle it is possible to detect accurately the instant at which it is desirable to de-energise the tool motor at the end of a screwdriving operation. Thus, each of the firing angles F1 . . . F6 is defined by a value, in this example a 4-bit code, for example angle F1 is defined by the code 0000, F2 by the code 0001, F3 by the code 00 11 and so on. The definition of the firing angle is effected by the programming of the microprocessor.

The microprocessor is also programmed to monitor the rate of change of firing angle and, when a change from say the angle defined by the code 0110 to that defined by the code 1000 occurs within a predetermined time period then the tool motor is de-energised. This illustrates how, in the current example the motor is stopped when there is a detected change which corresponds to an increase in the rate of changed of current in the motor. That is, the increase in firing angle within a predetermined time is detected and this firing angle is one such parameter which is related at least in part to the current in the motor. The firing angle codes between which the comparison is made are selected to indicate those at the beginning and the end of the time period T3 shown in FIG. 4.

To bring the drill/driver into use, it is first necessary to connect it to a source of mains power. That initiates a resetting of the control circuit by a signal from the reset circuit 33. Resetting involves the clearing of all memories in the control circuit including that of the LCD 10 and the setting up of all input and output ports and interrupts.

Figure 6A:
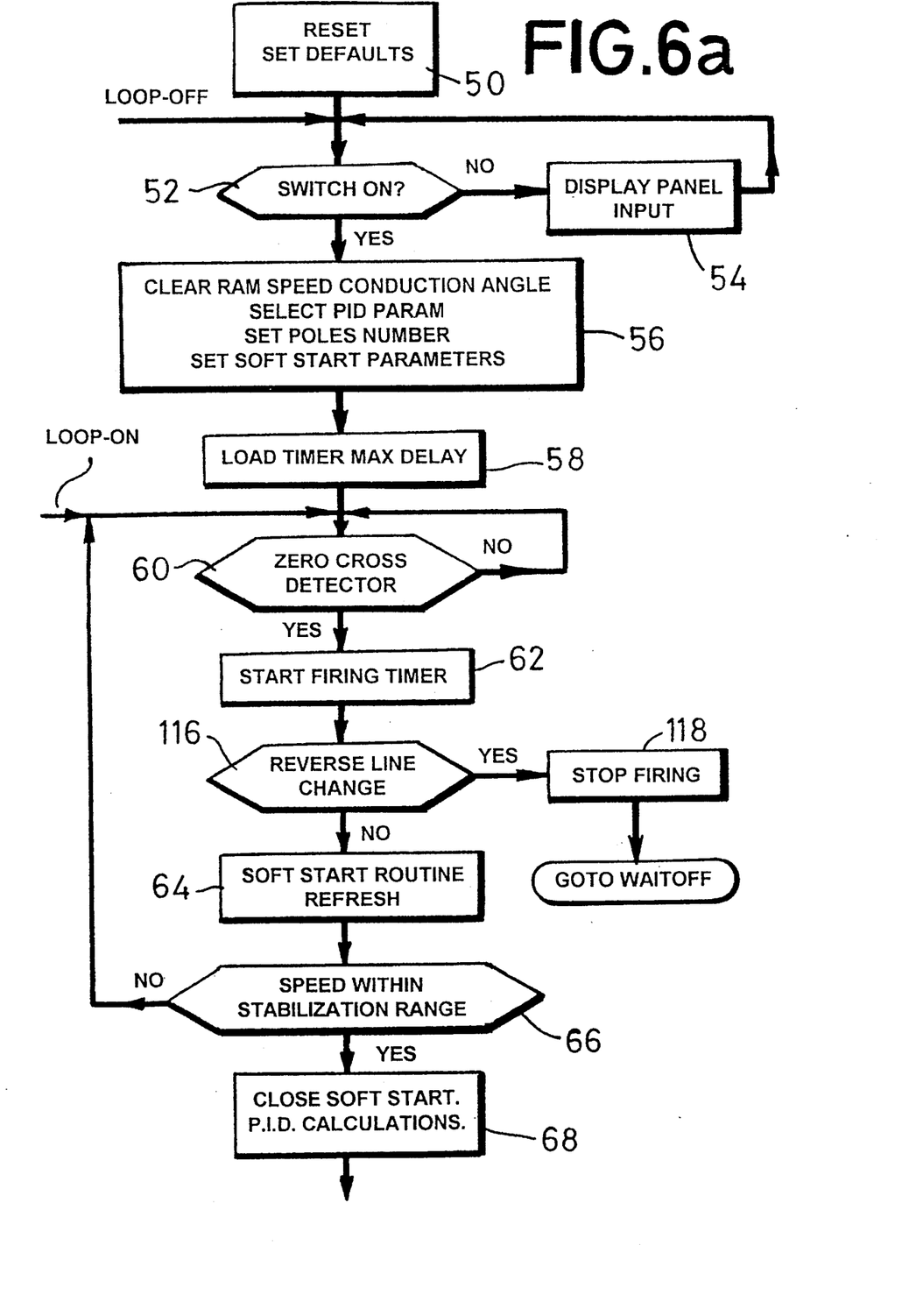
FIGS. 6a/b/c are a flow diagram illustrating control of the drill/driver.
Figure 6B:
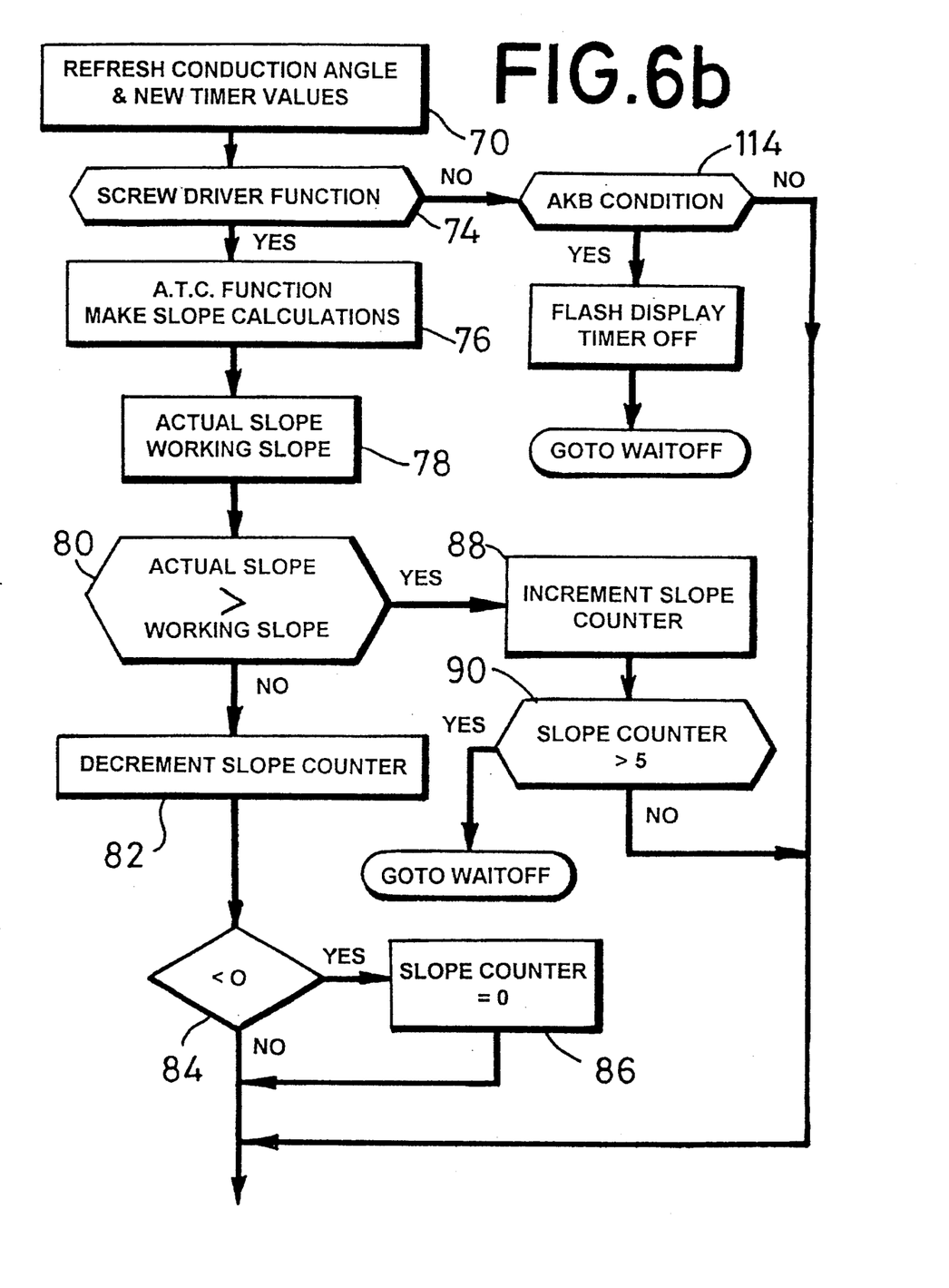
Figure 6C:
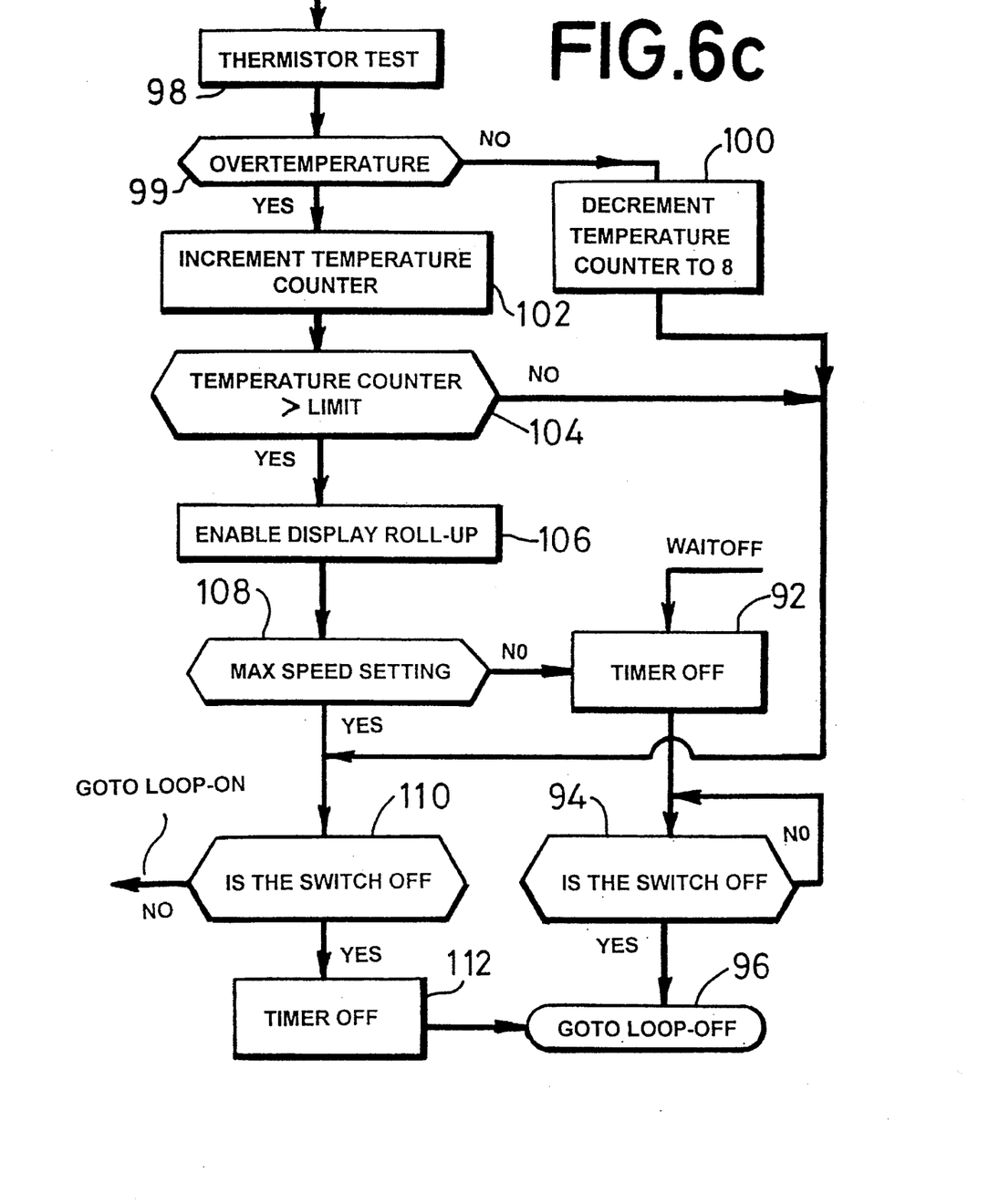

FIGS. 6a–c illustrate in flow diagram form a control program for the microprocessor 30. Initially, upon reset as described above, the program is started at step 50 which sets various default values for the drill, for example, the default drill speed for the display panel 7.

After the initial step 50 the program proceeds to step 52 which tests whether the switch 40 coupled to the trigger 3 is being operated. If the switch is not being operated the program loops through step 54 which implements any input from the display panel 7, the program returning to the test step 52. The program repeats this loop until the user presses the trigger 3 thereby operating the switch 40.

Once the switch 40 is operated, the program proceeds to further initialisation steps 56 and 58 which set up control variables to control the operation characteristics of the drill/driver. One feature of the drill/driver is soft-start of the drill motor which gradually accelerates the motor rotation from rest until the desired speed is attained. To achieve a slow turn-on, program step 58 loads the control circuit 42 with a maximum timer value (which corresponds to a maximum delay before the triac 41 is fired, and hence a minimum conduction time).

Speed control is implemented by program steps 60–70 and the soft-start feature is implemented by a sub-loop within the speed control steps as indicated by the loop return 72. Step 60 tests whether the AC power supply is crossing through zero and, if not, the step is merely repeated until a zero-cross is detected. Thereafter step 62 starts the control circuit (timer) 42 to fire the triac after the predetermined time delay. Step 64 refreshes the soft-start variables if the soft-start feature is still in operation. In particular step 64 reduces the time delay value for the control circuit (timer) 42 in order to increase the conduction time of the triac 41, and hence increase the motor speed. Step 66 tests whether the motor has yet attained has or almost attained the desired speed and, if not, the program loops back along the loop return 72 to step 60. Once the motor achieves approximately the desired speed, the program proceeds to step 68 which terminates the soft-start operation. Steps 68 and 70 also perform a speed monitoring and speed stabilisation process. In particular a proportional internal differential (P.I.D) parameter is calculated which indicates the difference between the actual motor speed and the desired speed. Step 70 refreshes the value for the control circuit (timer) 42 and adjusts the value as necessary depending on the P.I.D. parameter. If the actual speed is less than the desired speed, the timer value is decreased thereby to increase the conduction time of the triac 41. If the actual speed is greater than the desired speed, the timer value is increased thereby to decrease the conduction time of the triac 41.

If the screwdriver option has been selected, the program passes through step 74 to the automatic torque control feature implemented by program steps 76–90. Steps 76 and 78 perform calculations based on the time delay outputted to the control circuit (timer) 42 to determine a working (current-related) slope and an actual (current-related) slope. The working slope represents the slope when the shank of the screw is being driven into the workpiece (represented by the portion T2 of FIG. 4). Step 80 tests whether the actual slope exceeds the working slope. The program then modifies a variable called "slope counter" depending on the outcome of the test. The variable indicates the number of recent program occurrences for which the actual slope has exceeded the working slope. Each time that the test step 80 indicates that the actual slope is not greater than the working slope, the program proceeds to step 82 which decrements the slope counter variable. Steps 84 and 86 then test whether the variable has dropped below zero and, if so, the variable is made equal to zero. Each time that the test step 80 indicates that the actual slope is greater than the working slope, the program proceeds to step 88 which increments the slope counter variable. Step 90 then tests whether the variable has exceeded a predetermined value; in this exemplary embodiment the predetermined value is 5. If the predetermined value has been exceeded, this is the condition for the drill to be stopped automatically, and the program branches to a program label "waitoff" described below. If the predetermined value has not been exceeded, normal program execution continues.

This technique with the slope counter variable therefore implements a short delay before mining off the motor after the actual slope is detected to be greater than the working slope. The motor is not turned off until six consecutive or recent occurrences of such a condition have been detected. The program also avoids stopping the motor in the event of a low number (less than six) of spurious occurrences of an increased slope, since the program steps 82–86 will decrement the value of the slope counter variable on the next occasion that the actual slope is not greater than the working slope.

The program label "waitoff" leads the program into steps 92–96 which automatically stop the motor. Program step 92 halts the control circuit (timer) 42 thereby to inhibit further conduction of the triac 41, which in turn turns off the power supply to the motor. Program step 94 tests whether the user has yet released the trigger 3 to deactivate switch 40 and, if not, program step 94 is repeated until the user releases the trigger 3. Thereafter, program step 96 returns the program execution to program label "loop-off" which leads back to program step 52, to enable the drill to be re-used.

If the program does not branch to "waitoff", execution continues to steps 98–108 which provide an over-heating prevention feature. A variable called "temperature counter" is used to record the number of consecutive occasions that an overtemperature condition occurs. Program step 100 decrements the temperature counter to zero when the drill is not overtemperature, and program execution then jumps to step 110 discussed below. Program step 102 increments the counter when the drill is overtemperature. Program step 104 then tests whether the temperature counter variable has exceeded a predetermined "limit" and, if so, the program branches to the "waitoff" routine if the drill is not in its maximum speed setting. If the drill is in its maximum speed setting the program continues to step 110.

Program step 110 tests whether the switch 40 is off, i.e. whether the user has released the trigger 3. If not, then the program loops back to a program label "loop-on" which returns to program step 60. In this manner, the program is repeated to provide continuous speed control and, in the screwdriver mode, automatic torque control. If the switch 40 is determined to be off, then program step 112 halts the control circuit (timer) 42 thereby to stop the drill motor in the same manner as program step 92 discussed above. The program then continues to program step 96 which jumps to the program label "loop-off".

When the drill is not operating in the screwdriver mode, the automatic torque control feature provided by program steps 76–90 is bypassed. A program branch is performed by step 74 through step 114. Step 114 provides anti-kickback protection. A further safety feature is also provided by a program step 116 interposed between steps 62 and 64 in the speed control portion of the program. Step 116 tests whether the "reverse" switch of the drill has been operated while the drill is in use (i.e. motor turning). If so, program execution branches to step 118 which halts the control circuit (timer) 42 thereby to stop the drill motor. The program then jumps to the program label "waitoff" described above.

The described embodiment is a drill driver which has an LCD. The invention is of course applicable to any power driver or power drill having a screwdriving facility, against which may be mentioned, for example, power drill/drivers wherein the pre-setting of the tool is by means of a rotating switch controlling a potentiometer rather than by buttons on an LCD display panel.

A second embodiment of the present invention will now be described with reference to FIGS. 7 and 8.

Figure 7:
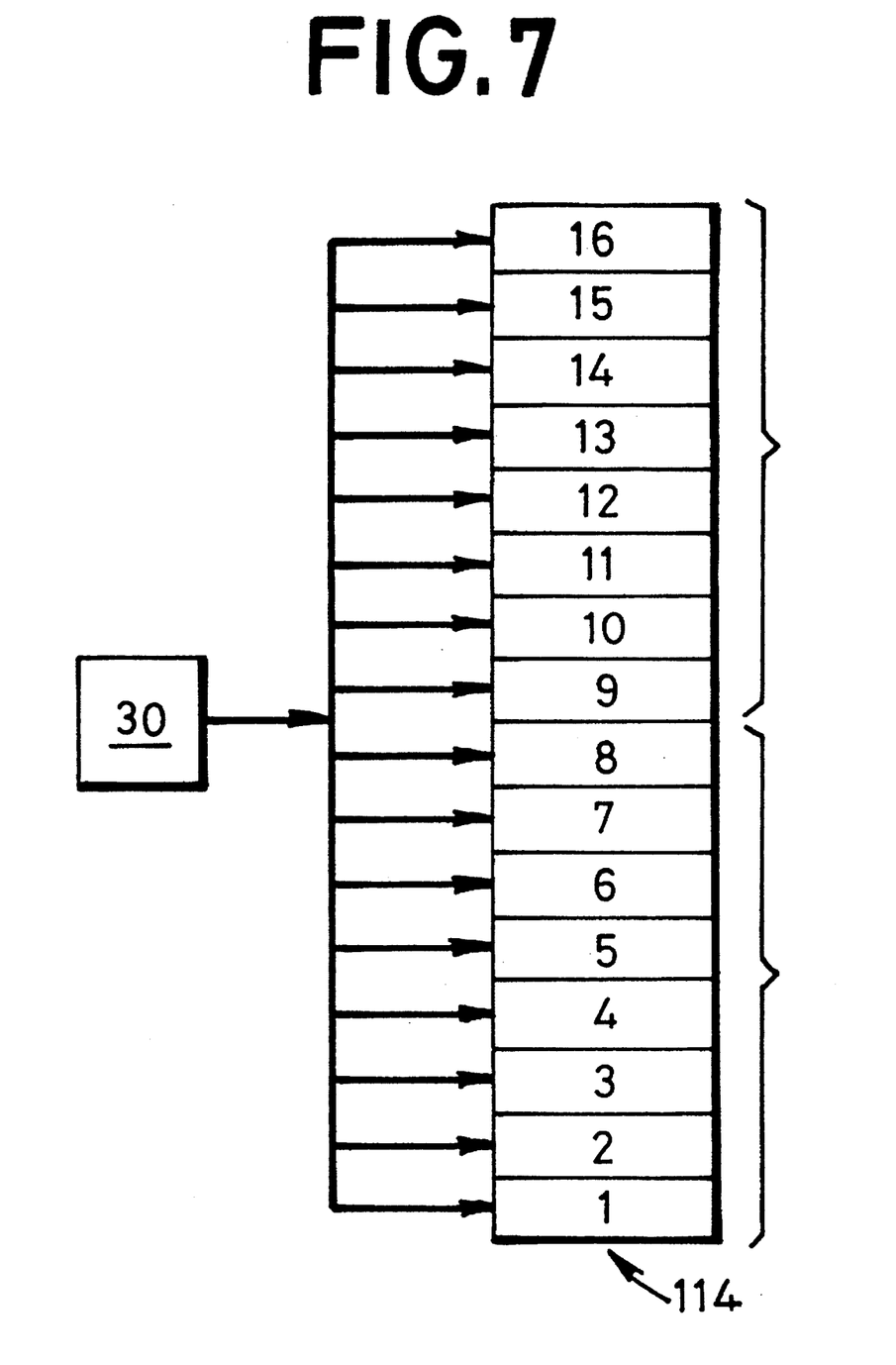
FIG. 7 illustrates schematically a shift register according to the second embodiment of the present invention.

FIG. 7 illustrates schematically a sixteen-stage serial memory shift register 114. The register 114 is part of the microprocessor 30 and operates under the control thereof. In addition to supplying the programmable timer within the control circuit 42 with a time delay input, the microprocessor 30 also supplies this time delay to the register 114 in the following manner.

Each half-cycle during which the triac 41 may be fired, as illustrated in FIGS. 5a and 5b, is of 10 ms duration. This 10 ms half-cycle corresponds to 500 counts made by the microprocessor 30. So if, for example, there was a delay of 2 ms before the triac 41 was fired during any given half-cycle, this would correspond to a count of 100. It will be noted that it is the delay before firing rather than the duration of the ruing itself of the triac 41 which is being measured.

Referring once again to FIG. 7, it will be seen that into each of the sixteen stages of the register 114 is inputted from the microprocessor 30 the count which corresponds to the delay before firing the triac 41 for that half-cycle. Thus the most recent (i.e. the current count) count occupies stage number 1 and the oldest count occupies stage number 16. It will be apparent that the time span over which the shift register 114 occupies memory is 160 ms (16 stage each of 10 ms duration) and that the shift register is of the last-in-first-out (LIFO) type.

The counts within each of the stages of register 114 is, as in the previous example, the time delay before firing of the triac 41 necessary to maintain the shaft of the drill/driver rotating at a constant speed, here 200 r.p.m.

Once the drill/driver has been energised for a sufficient length of time for all stages of the register 114 to hold a respective count, then the microprocessor performs the following calculations necessary to determine whether to continue the energisation of the drill/driver or to stop it.

For each count update of the shift register 114, the microprocessor 30 divides the sixteen stages of the register 114 into two halves. One half comprises the eight oldest counts, $8_{OLD}$, and the other half comprises the eight newest counts, $8_{NEW}$.

The microprocessor 30 then calculates the average of all the $8_{OLD}$ counts, $\overline{8_{OLD}}$, and also the average of all the $8_{NEW}$ counts, $\overline{8_{NEW}}$. This results in two derived values $\overline{8_{OLD}}$ and $\overline{8_{NEW}}$.

Next the following calculation is performed:

$$\overline{8_{OLD}} - \overline{8_{NEW}} \rightarrow RESULT$$

The value RESULT is a single number and is used for comparison with a further derived value, as will be described below. It will, however, be apparent that because each of the counts in the register is 114 is actually a measure of the delay before firing the triac 41 then, as the shank of a screw is driven further into a workpiece and thus the resistance offered by the screw to the drill/driver increases, then the delay before firing must be concomitantly reduced in order to maintain a steady 200 rpm, as described with reference to the previous embodiment. Hence, as the screw takes further and further into the workpiece, then the values $\overline{8_{NEW}}$ and $\overline{8_{OLD}}$ become smaller. However, because the value RESULT is calculated as the difference between $\overline{8_{OLD}}$ and $\overline{8_{NEW}}$ over a given period of time, the RESULT will not itself change unless the rate of change between $\overline{8_{OLD}}$ and $\overline{8_{NEW}}$ changes. This achieves a measure of the gradient as shown previously with reference to FIG. 4.

As has been stated above, it is necessary for the derived value RESULT to be compared with another derived value in order for a judgement to be made as to whether or not to de-energise the drill/driver. This derived value, SENSITIVITY is calculated as follows:

$$\text{SENSITIVITY} = K - \frac{\overline{8_{NEW}}}{4}$$

where K is a number and is a constant for a particular drill/driver and $\overline{8_{NEW}}$ is the average value of the $\overline{8_{NEW}}$ counts shown in FIG. 7.

The microprocessor 30 de-energises the drill only if the following condition holds:

RESULT>SENSITIVITY

Figure 8:
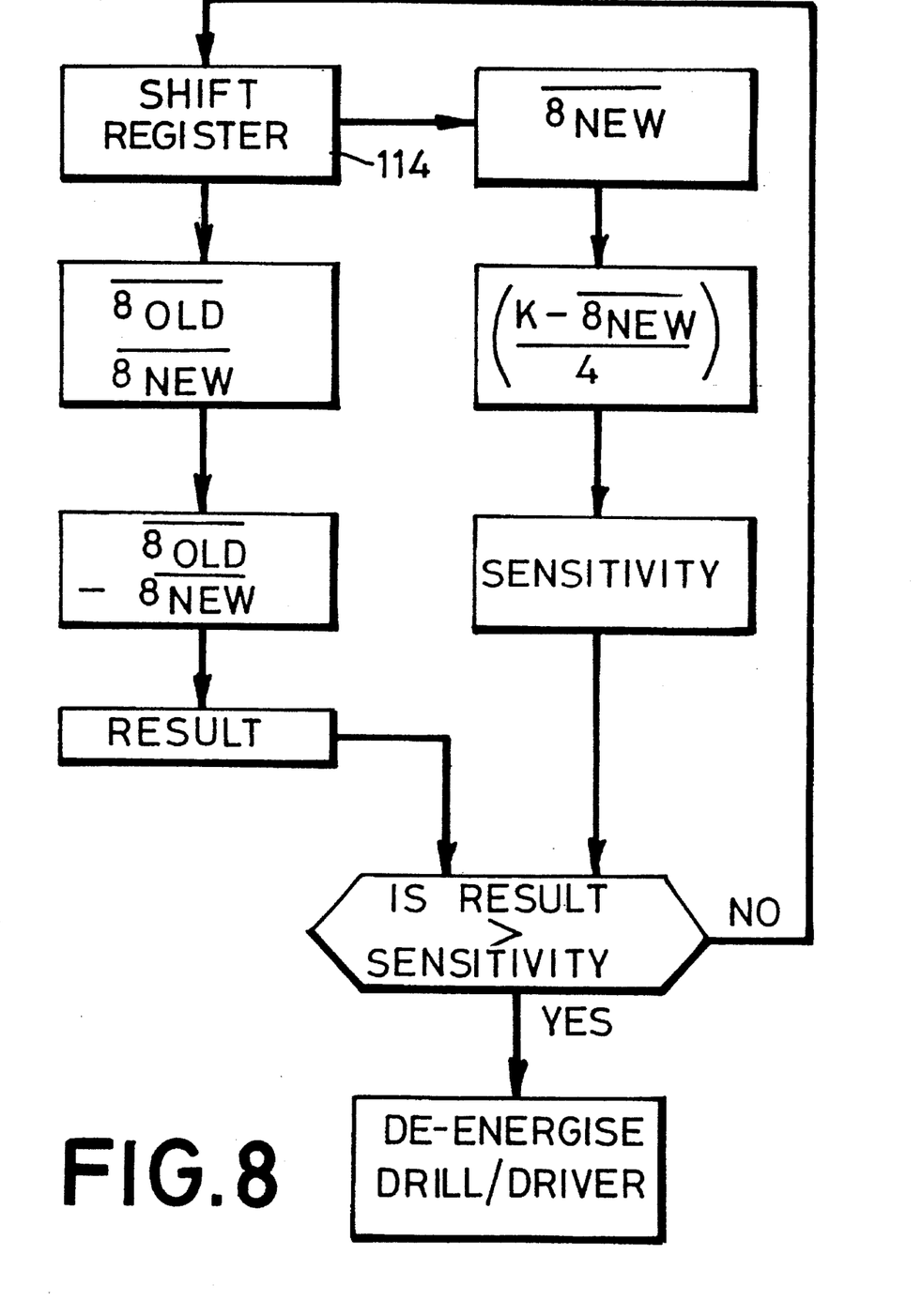
FIG. 8 shows a flow chart of the second embodiment of the present invention.

This decision making process is illustrated by the flow chart shown in FIG. 8.

If the condition that RESULT>SENSITIVITY does not hold, then the whole process described above is repeated, but with the counts in the register 114 updated by one stage, i.e. by another half-cycle. This means that all previous values 1–15 move one stage further along the register 114, with value 16 being discarded and a new value at stage 1 being input by the microprocessor 30.

Referring now once again to the derived value SENSITIVITY, it will be appreciated that in some circumstances it may be desirable to give different drill/drivers different levels of sensitivity, that is to place constraints on the rate of increase of current, or parameter related at least in part thereto, which can be tolerated before de-energising takes place.

For example, as has been described hereinbefore, the actual current values through the motor will depend upon the screw size. It will also depend on the hardness of the workpiece into which the screw is being driven. Thus, for a small screw being driven into a soft wood, a much smaller current and shallower gradient of curve (see FIG. 4) will be seen than for a large screw being driven into a hard wood. however, as has been described above, if the drill/driver, on driving the shank of the large screw into hard wood, detects changes in resistance offered by the screw (due to, say, inhomogeneties in the wood) sufficient to hold good the requirement that RESULT>SENSITIVITY, then the drill/driver will be de-energised.

This change in resistance offered by the large screw may, in absolute terms, be the same as would be offered by the head of a small screw coming into contact with the surface of soft wood.

So, if the drill/driver were actually being used to drive a small screw into soft wood, a satisfactory result would have been achieved. However, if the drill/driver had been driving a large screw into hard wood, an undesired de-energising would have resulted.

Thus, by offering the capability of changing the value of K for different drill/drivers, the above problem could be alleviated. For example, K could be set such that the problem outlined above could be altered so that only large screws are to be used with the particular drill/driver in question. This is because the resistance offered by the head of the small screw engaging a worksurface would not be sufficient to cause RESULT>SENSITIVITY to hold due to the change in SENSITIVITY caused by altering the value of K.

Examples of values used in the above calculations are shown below and with reference to FIGS. 9–11. It will be noted that in each of these FIGURES the data held within the shift register 114 is actually held both in hexadecimal and in decimal. The value of K has been chosen here to be 400.

Figure 9:
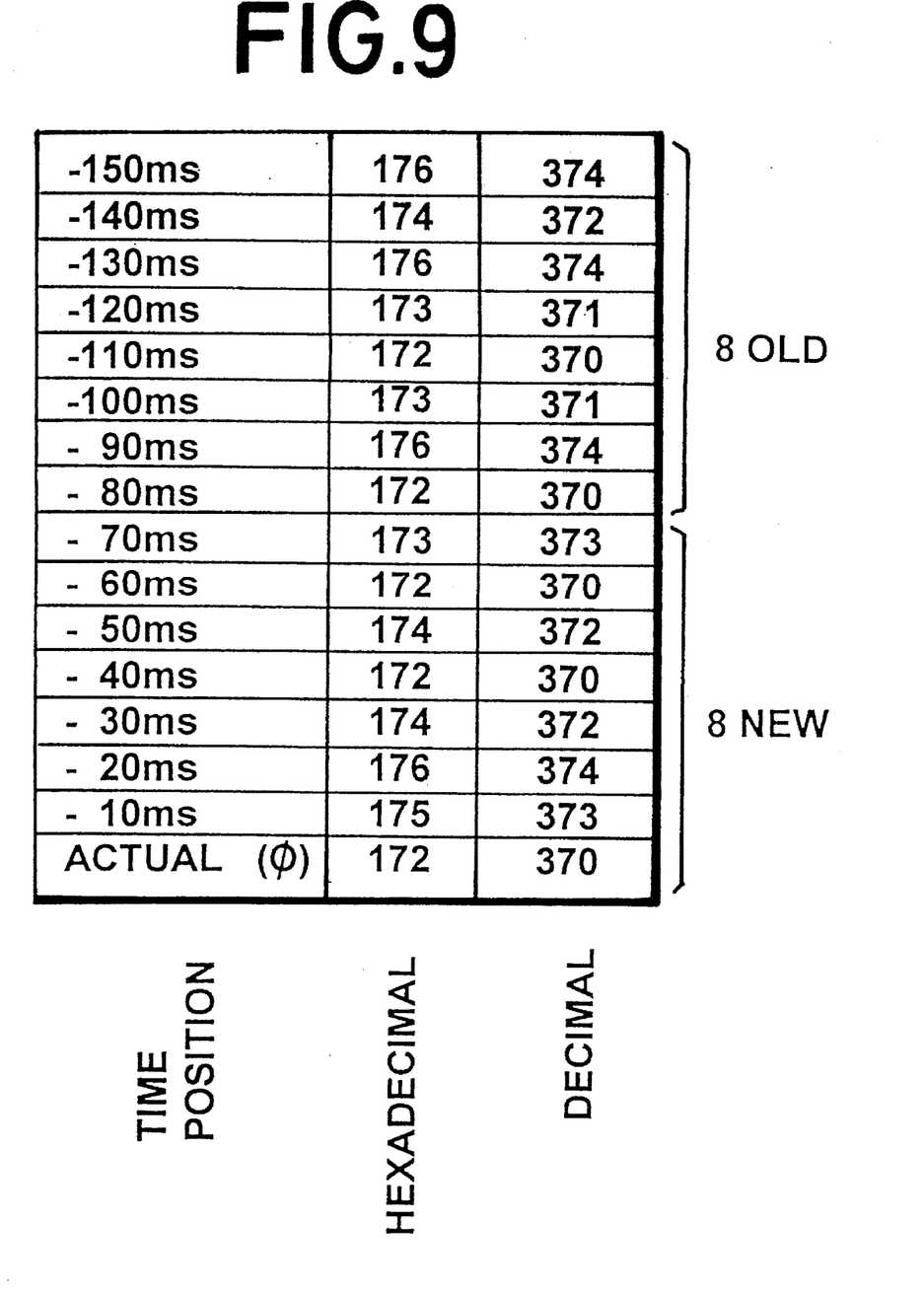
FIG. 9 illustrates schematically typical data held within the register of FIG. 7 when there is no load on the drill/driver.

FIG. 9 shows both the hexadecimal count and the corresponding decimal count for each of the sixteen stages in the shift register 114 for a drill/driver being run under a no-load condition, i.e. the drill/driver is energised but being run in free space without any resistive load engaging the chuck 4. The decimal values are then split into the $\overline{8_{OLD}}$ and $\overline{8_{NEW}}$ values as described hereinbefore.

The calculations necessary to decide whether or not to de-energise the drill/driver are then undertaken. As can be seen by referring to the decimal column of FIG. 9, $\overline{8_{OLD}}$=372 and $\overline{8_{NEW}}$=371

So $\overline{8_{OLD}}$-$\overline{8_{NEW}}$=372-371 =1

∴RESULT=1

And the value with which RESULT is to be compared, SENSITIVITY, is derived as follows:

$$\text{SENSITIVITY} = \frac{(K - \overline{8_{NEW}})}{4} = \frac{(400 - 371)}{4} = 7$$

Figure 10:
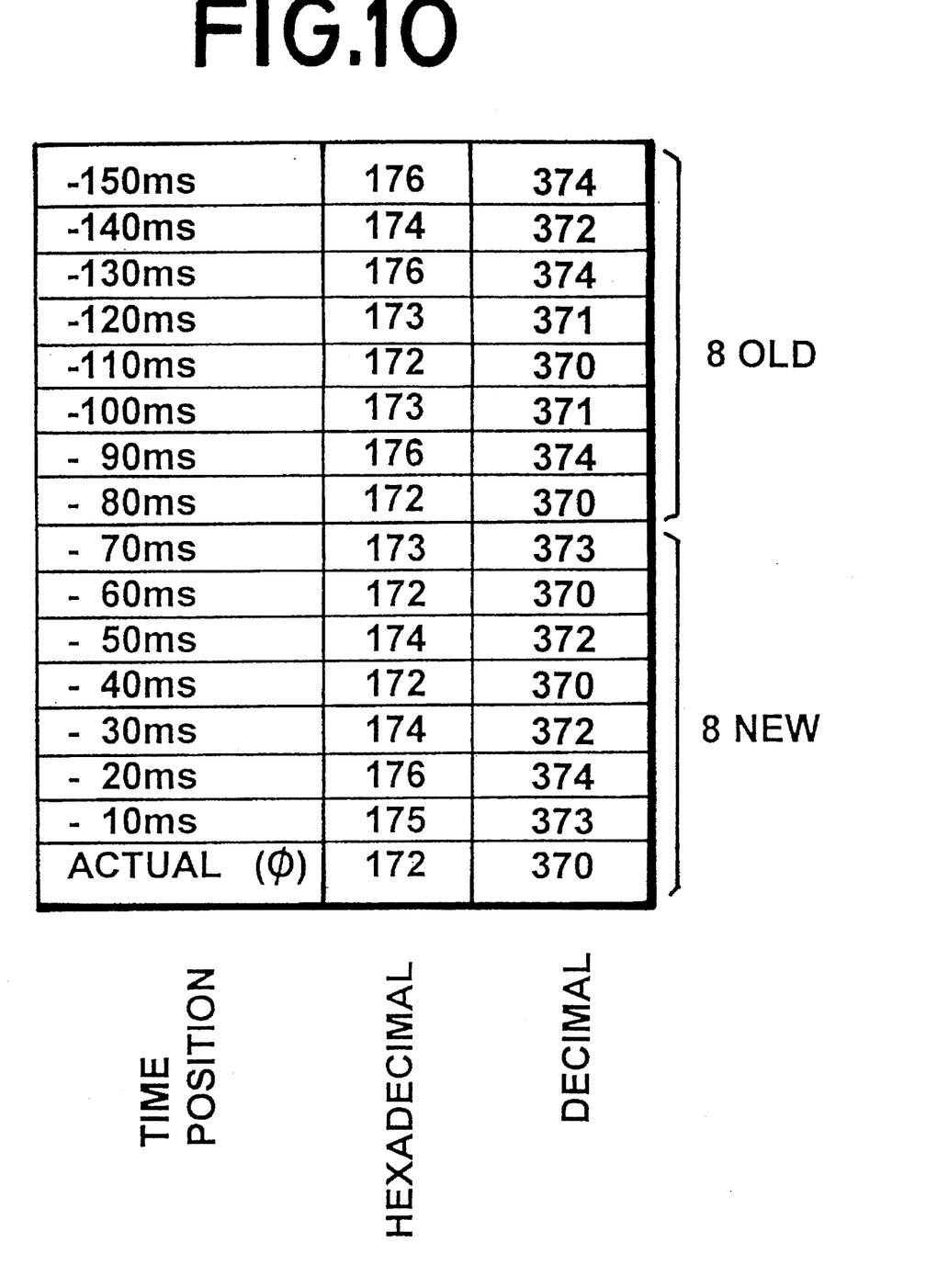
FIG. 10 illustrates schematically typical data held within the register of FIG. 7 when the drill/driver is screwing a screw into a workpiece; and, FIG. 11 illustrates schematically typical data held within the register of FIG. 7 when the end of the screw rag operation has been reached.
Figure 11:
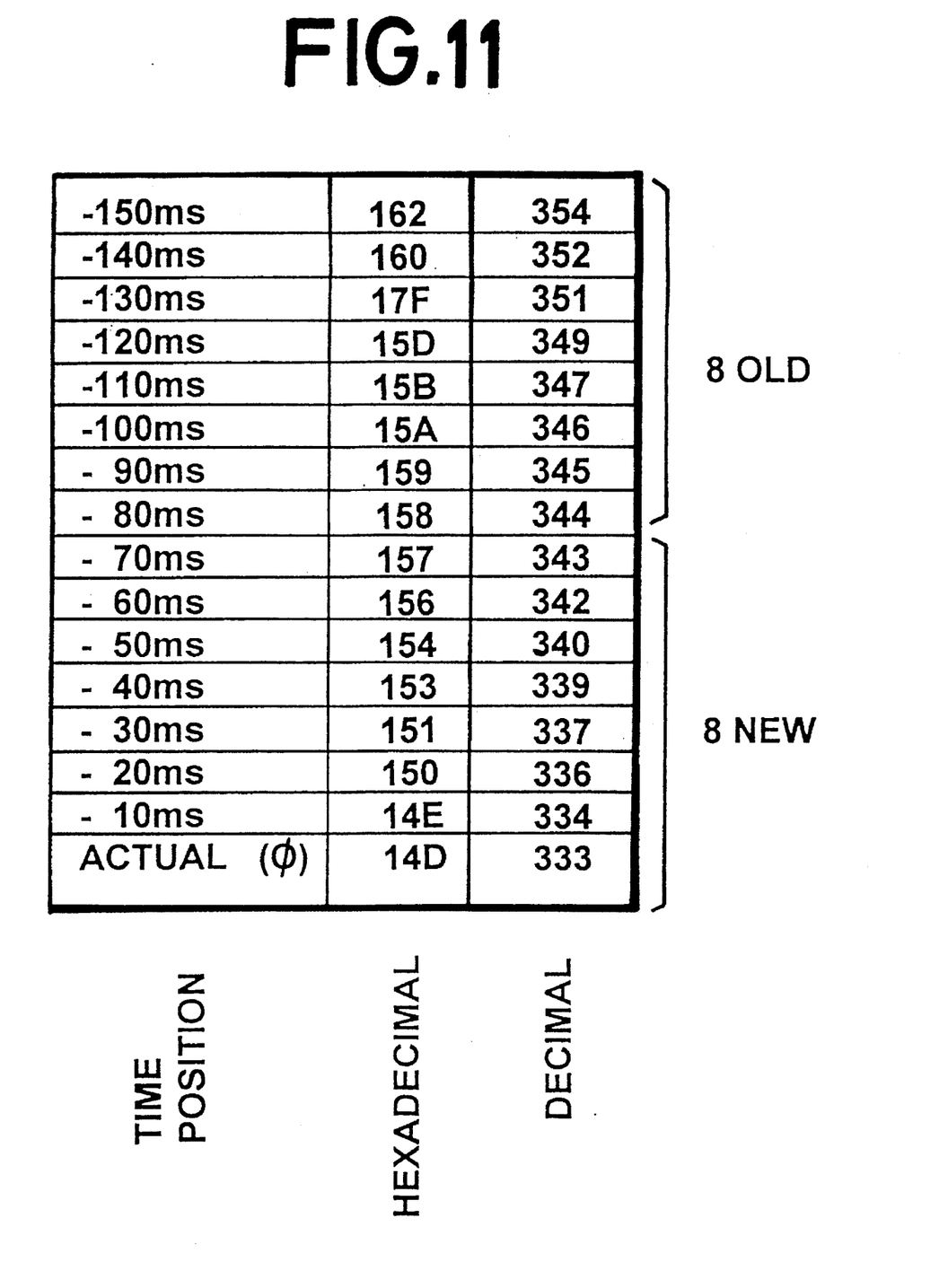

Thus RESULT<SENSITIVITY and so the drill/driver is not de-energised and so all the values in the stages of the register 114 are scrolled on by one place losing the oldest value and providing a new current, or as in FIGS. 9–11, ACTUAL value.

Figure 4:
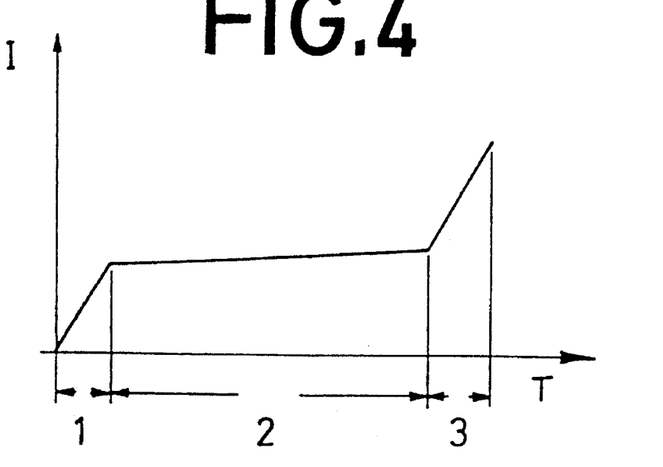

FIG. 10 shows the case of a drill/driver performing a screwing operation along the region T2 in FIG. 4.

Here it can be seen that $\overline{8_{OLD}}$=348 and $\overline{8_{NEW}}$=338 Thus $\overline{8_{OLD}}$-$\overline{8_{NEW}}$=RESULT =10 and $$\text{SENSITIVITY} = \frac{(400 - \overline{8_{NEW}})}{4} = \frac{(400 - 338)}{4} = 15$$

Thus RESULT<SENSITIVITY and so, again, the driver is not de-energised.

FIG. 11 shows the case during the transition from region T2 to region T3 of FIG. 4.

Here it can be seen that $\overline{8_{OLD}}$=357 and $\overline{8_{NEW}}$=317 thus RESULT=$\overline{8_{OLD}}$-$\overline{8_{NEW}}$=357-317=40 and $$\text{SENSITIVITY} = \frac{(400 - 317)}{4} = 20$$

Thus RESULT>SENSITIVITY and so the drill/driver is de-energised.

We claim:

1. A method of controlling a drill/driver, the drill/driver including a rotatable shaft arranged to mount a screwdriver and bit and a motor for rotatably driving the shaft, the motor being driven only during predetermined conduction periods; the method comprising the steps of providing, within a given time period, a value which is a function of the conduction period necessary to maintain a given motor speed, and stopping the motor if this value has exceeded a predetermined amount before the end of the given time period.

2. A method according to claim 1 wherein the given motor speed is a steady motor speed.

3. A method according to claim 1, wherein the motor is stopped when RESULT is greater than SENSITIVITY, where:

RESULT=$\overline{X_{OLD}}$-$\overline{X_{NEW}}$; and $$\text{SENSITIVITY} = K - \left( \frac{\overline{X_{NEW}}}{Y} \right)$$

where $\overline{X_{OLD}}$ is the mean of X current values through the motor over a first time period $\overline{X_{NEW}}$ is the mean of X current values rough the motor over a second subsequent time period; K is a constant; X is the number of discrete current value measurements between 1 and 16; and, Y is a scaling factor between 1 and 10.

4. A drill/driver comprising: a rotatable shaft arranged to mount a screw driver bit; a motor rotatably driving the shaft; a speed controller for controlling the speed of rotation of the motor by driving the motor during conduction periods and varying the duration of said conduction periods to maintain a desired speed; characterized by monitoring means for monitoring the current in the motor by monitoring the duration of said conduction periods and control means responsive to said monitoring means for interrupting power to the motor when the duration of said conduction periods increases in a predetermined manner.

5. A drill/driver according to claim 4, further comprising manual override means for disabling said control means to provide manual control of the motor.

6. A drill/driver according to claim 4 wherein said control means interrupts power to the motor when the rate of change in the duration of said conduction periods increases by a predetermined amount.

7. A drill driver according to claim 6 wherein said control means interrupts power to the motor when RESULT is greater than SENSITIVITY, where:

$$\text{RESULT} = \overline{X_{OLD}} - \overline{X_{NEW}}; \text{ and}$$

$$\text{SENSITIVITY} = K - \left( \frac{\overline{X_{NEW}}}{y} \right)$$

where $\overline{X_{OLD}}$ is the mean of X current values through the motor over a first time period; $\overline{X_{NEW}}$ is the mean of X current values through the motor over a second subsequent time period; K is a constant, X is the number of discrete current value measurements between 1 and 16; and, Y is a scaling factor between 1 and 10.

8. A drill/driver according to claim 6, wherein said control means implements a delay before the motor is stopped once said predetermined increase in the rate of change in the duration of said conduction periods has been detected.

9. A drill/driver according to claim 6, wherein the motor is an A.C. motor, and the speed controller comprises voltage controlled rectifier means for controlling the power-on portion or portions of each A.C. cycle in order to achieve a desired speed.

10. A drill/driver according to claim 9, wherein said monitoring means comprises means for monitoring the conduction tim voltage controlled rectifier means.

11. A drill/driver according to claim 9, wherein said monitoring means comprises means for monitoring the relative phase at which the voltage controlled rectifier means is triggered for conduction.

12. A method of controlling a drill/driver, the drill/driver including a rotatable shaft arranged to mourn a screwdriver and bit and a motor for rotatably driving the shaft, the motor being driven only during predetermined conduction periods; the method comprising the steps of:

maintaining a substantially constant motor speed by controlling the duration of said conduction periods;

monitoring the rate of change in the duration of said conduction periods, and interrupting power to the motor when said rate of change increases in a predetermined manner.

13. The method of claim 12 wherein said conduction periods are periodic and interspersed with non-conduction periods, and further wherein said monitoring step comprises the steps of storing a first set of values related to the durations of a predetermined number of successive conduction periods, storing a second set of values related to the durations of the next successive predetermined number of conduction periods, averaging said first and second sets of values, and determining the difference between the average of said first set of values and the average of said second set of values.

14. The method of claim 13 wherein said interruption step is performed when RESULT is greater than SENSITIVITY, where:

$$\text{RESULT} = \overline{X_{OLD}} - \overline{X_{NEW}}; \text{ and}$$

$$\text{SENSITIVITY} = K - \left( \frac{\overline{X_{NEW}}}{y} \right)$$

$\overline{X_{OLD}}$ is the average of said first set of values;
$\overline{X_{NEW}}$ is the average of said second set of values;
K is a constant; and
Y is a scaling factor between 1 and 10.

\* \* \* \* \*